(12) United States Patent
Wyland

(10) Patent No.: US 6,738,837 B1
(45) Date of Patent: May 18, 2004

(54) DIGITAL SYSTEM WITH SPLIT TRANSACTION MEMORY ACCESS

(75) Inventor: David C. Wyland, Morgan Hill, CA (US)

(73) Assignee: Cradle Technologies, Inc., Mountain View, CA (US)

( * ) Notice: Subject to any disclaimer, the term of this patent is extended or adjusted under 35 U.S.C. 154(b) by 195 days.

(21) Appl. No.: 10/062,111

(22) Filed: Feb. 1, 2002

Related U.S. Application Data

(60) Provisional application No. 60/266,002, filed on Feb. 2, 2001.

(51) Int. Cl.[7] ............................................. G06F 13/28
(52) U.S. Cl. ......................... 710/25; 710/22; 710/23; 710/24; 710/26; 710/27; 710/28; 710/15; 712/22
(58) Field of Search ........................... 710/22–28, 15, 710/20, 21; 712/22

(56) References Cited

U.S. PATENT DOCUMENTS

| | | | |
|---|---|---|---|
| 5,345,562 A | 9/1994 | Chen | 395/275 |
| 5,761,724 A | 6/1998 | Jhon et al. | 711/144 |
| 5,911,052 A | 6/1999 | Singhal et al. | 395/293 |
| 5,940,856 A | 8/1999 | Arimilli et al. | 711/119 |

*Primary Examiner*—Jeffrey Gaffin
*Assistant Examiner*—Alan Chen
(74) *Attorney, Agent, or Firm*—Thomas Schneck

(57) ABSTRACT

A digital system having a split transaction memory access. The digital system can access data from a system memory through a read buffer (FIFO) located between the processor of the digital system and the system bus. The read buffer is implemented with two FIFOs, a first incoming data FIFO for reading data, and a second outgoing address FIFO for transmitting read requests. The processor of the digital system can access the data FIFO and read data while the data transfer is still in progress. This decreases the processing latency, which allows the processor to be free to perform additional tasks.

26 Claims, 5 Drawing Sheets

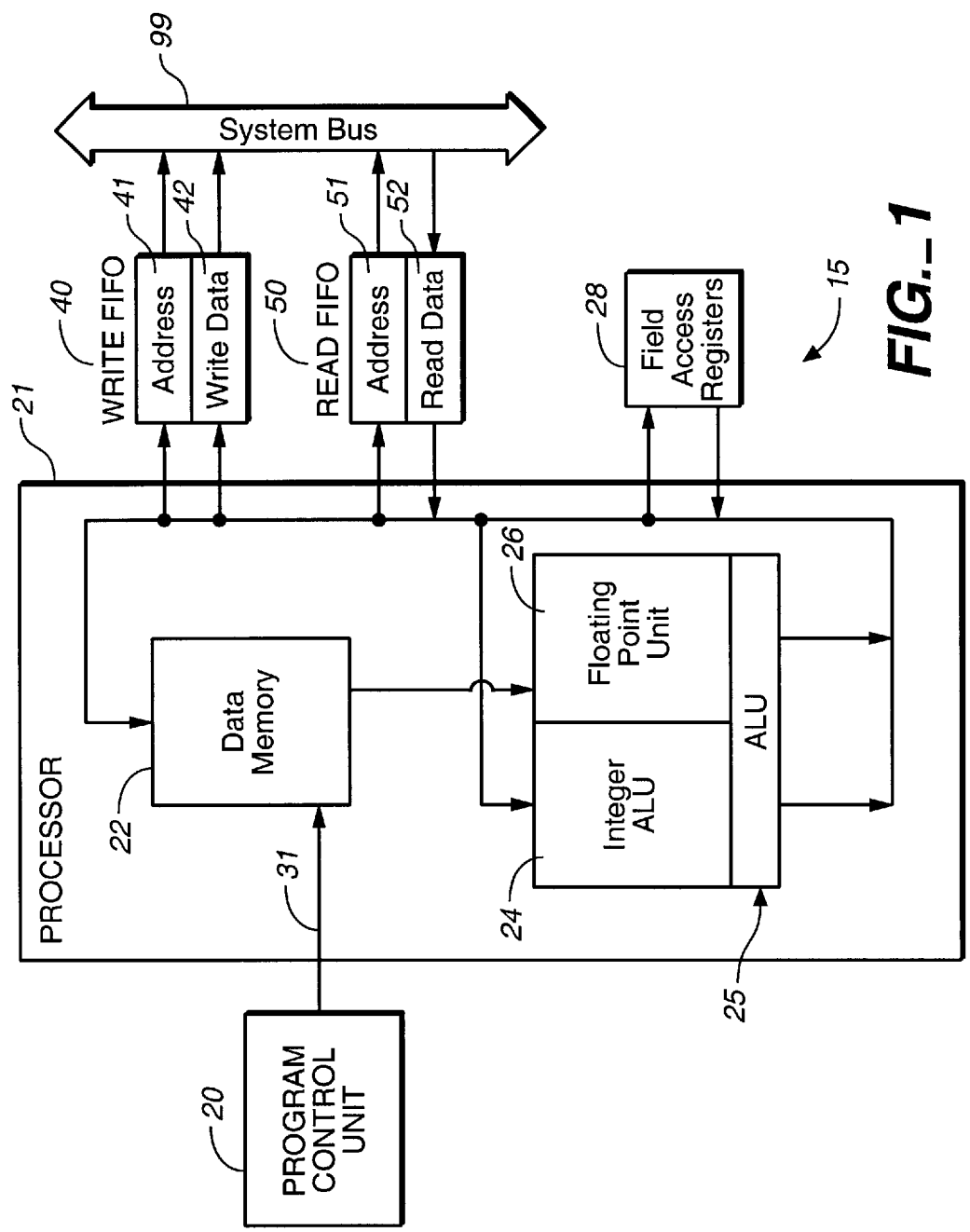
FIG._1

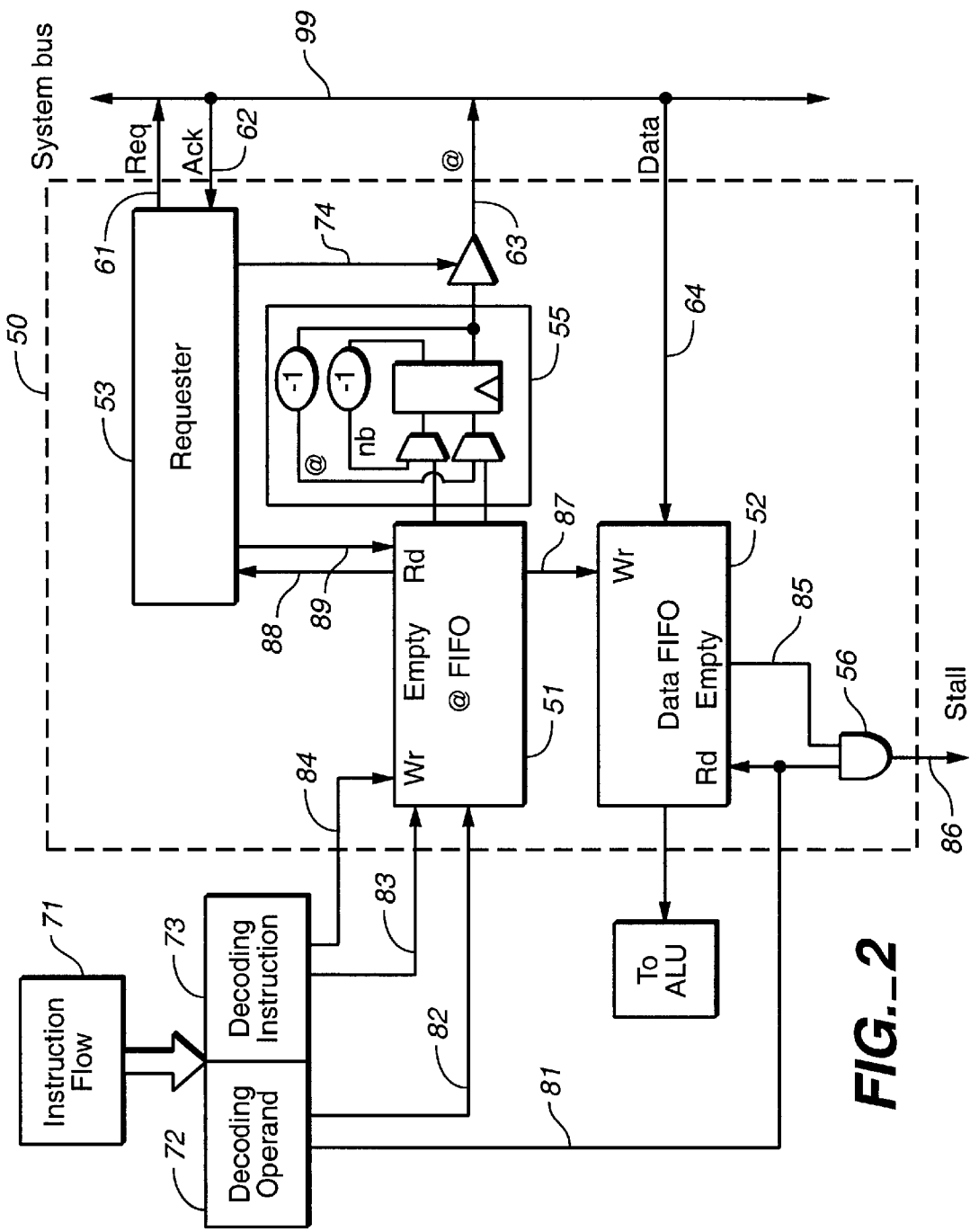
FIG._2

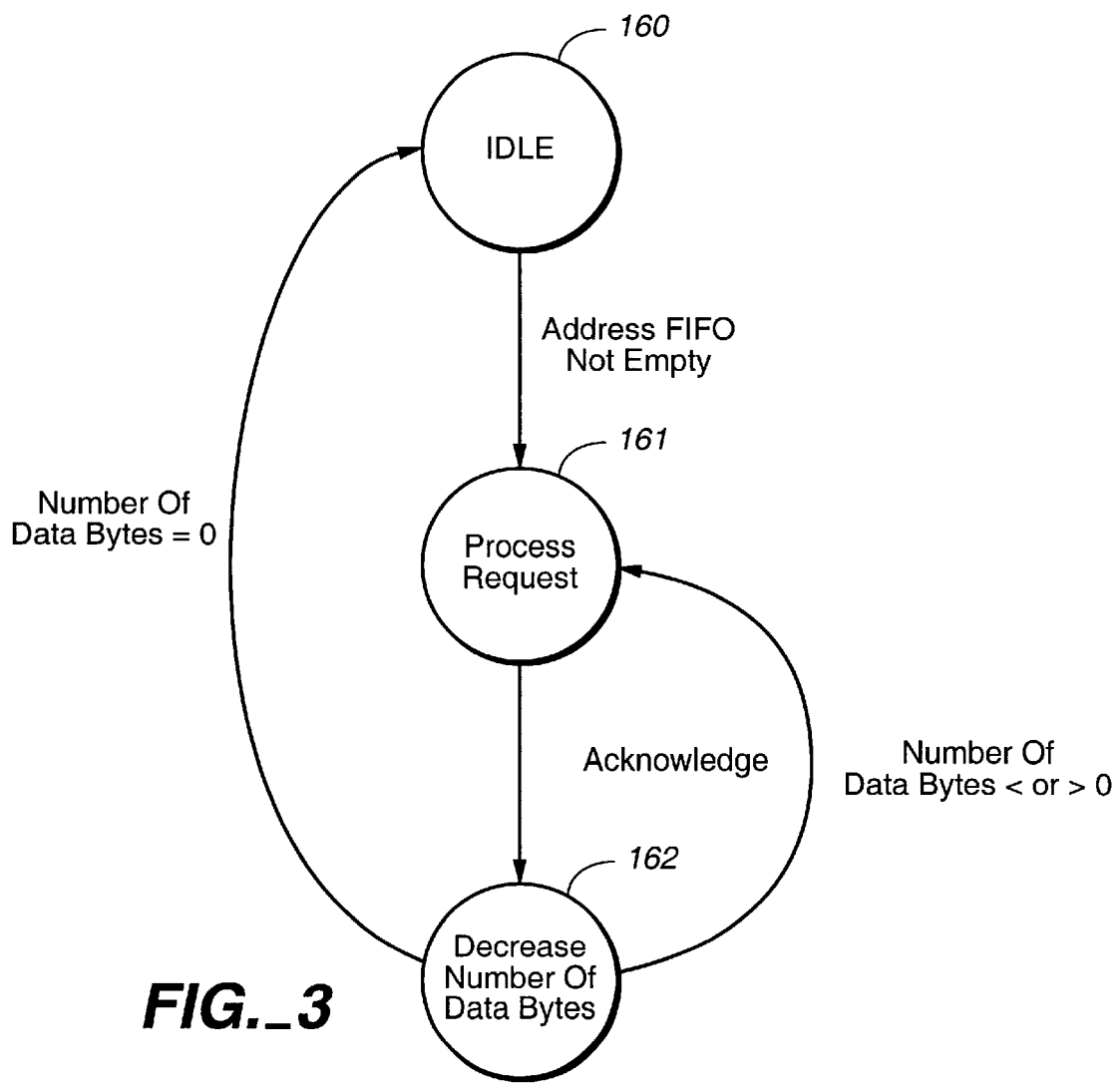
FIG._3

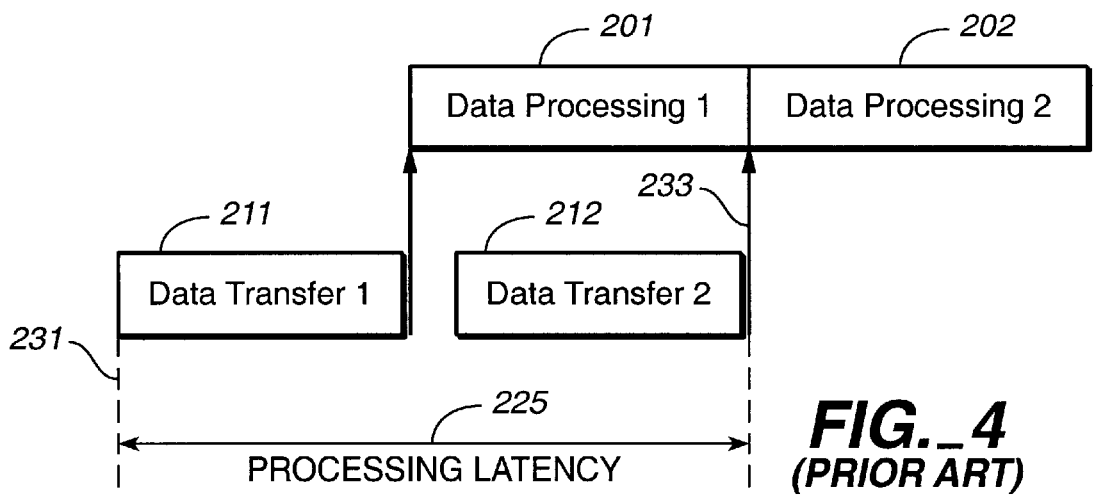
FIG._4
(PRIOR ART)
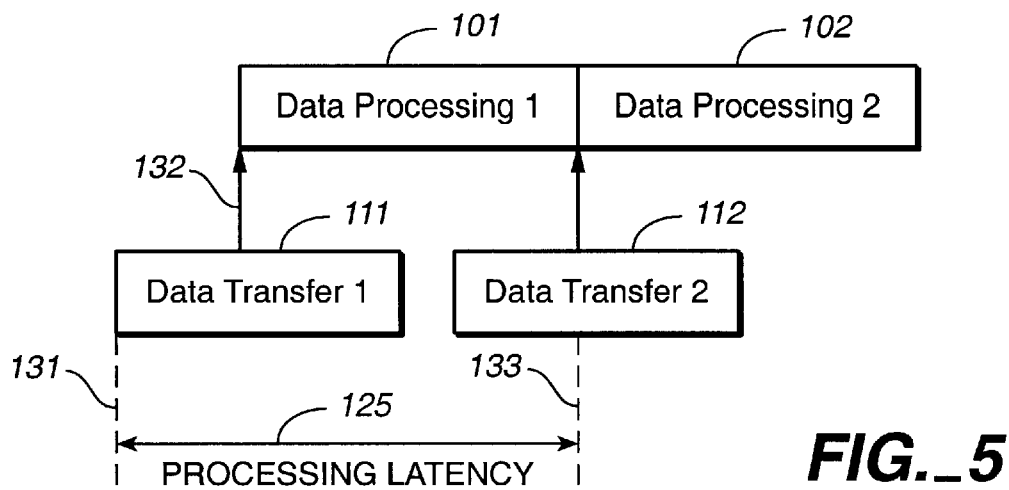
FIG._5

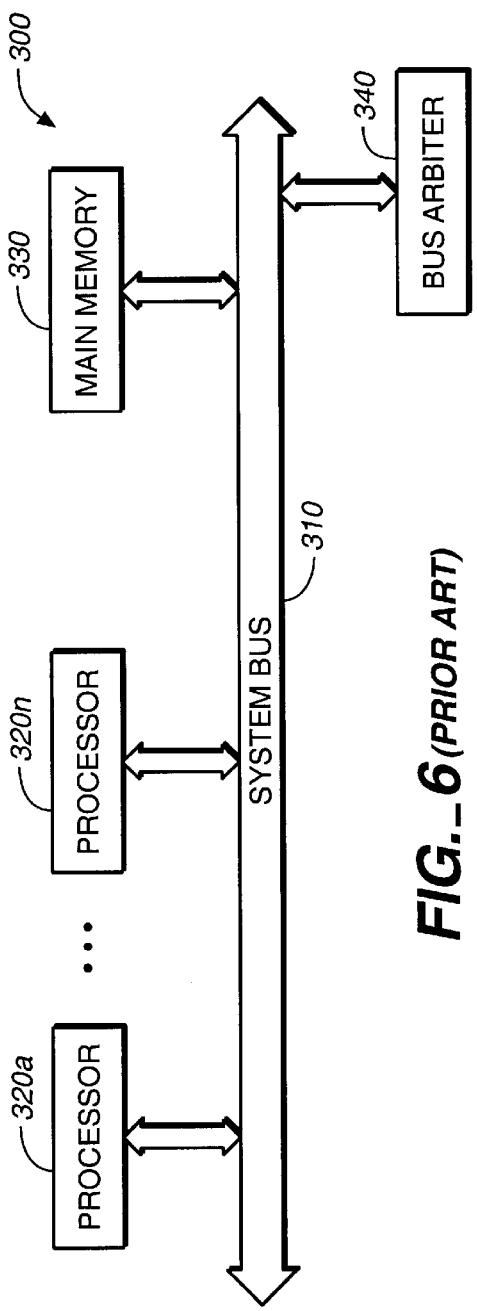
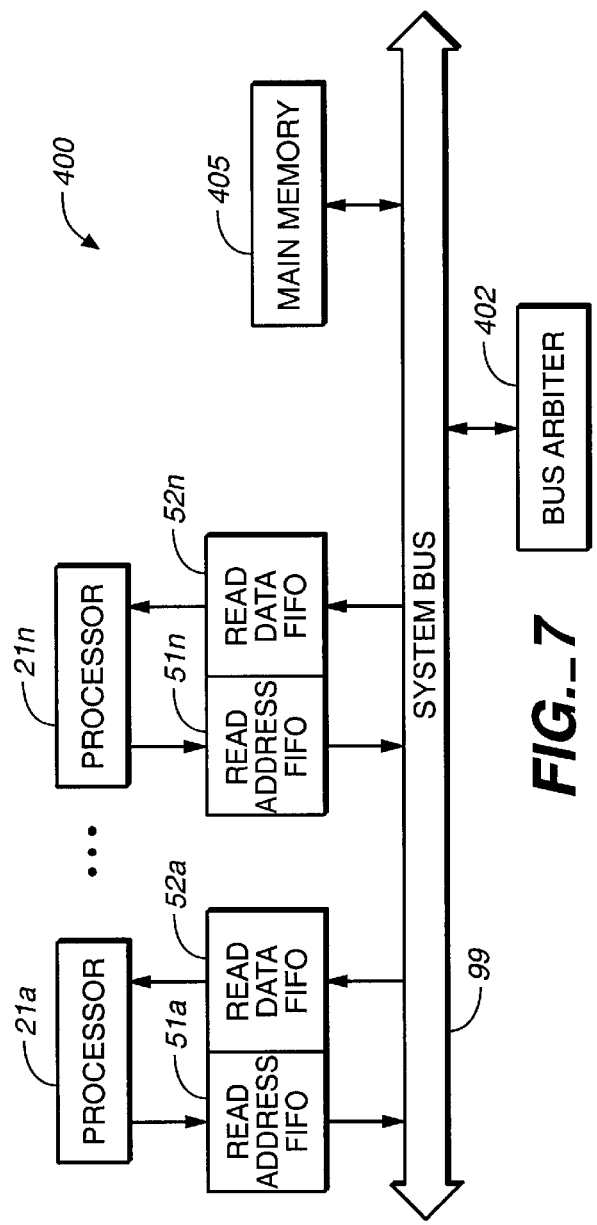
FIG._6 (PRIOR ART)
FIG._7

DIGITAL SYSTEM WITH SPLIT TRANSACTION MEMORY ACCESS

CROSS-REFERENCE TO RELATED APPLICATION

This application claims the benefit of U.S. provisional application No. 60/266,002, filed Feb. 2, 2001.

TECHNICAL FIELD

The invention relates generally to computer systems and more particularly to a digital computer system or processor having a split transaction memory access structure.

BACKGROUND ART

As the demand for faster microprocessors increases, there is a need for decreasing the latency of data processing. With reference to FIG. 4, the data transfer time 211, 212 is the time needed to transfer data between a memory and a processing engine. The processing time 201, 202 is the time needed to process all of the transferred data. The processing latency 225 is the time from the beginning of the transfer to the completion of the data processing. In the prior art, the data processing 201, 202 usually starts after the data transfer 211, 212 is completed. As shown in FIG. 4, this makes the processing latency 225 equal to the entire data transfer time 211 plus the entire data processing time 201.

FIG. 6 shows a typical direct memory access (DMA) computer system 300 as is known in the prior art. The computer 300 includes a system bus 310, a plurality of processors 320a . . . 320n coupled to the system bus 310, a main memory 330 coupled to the system bus 310, and a bus arbiter 340 coupled to the system bus 310. In the DMA computer system 300, a memory read by the process 320a to obtain a data unit (byte, or word) can be carried out as follows. The processor 320a requests for system bus use. If there are multiple bus requests pending, the bus arbiter 340 grants the system bus 310 to one of the requesters according to some bus allocation policy. When the system bus 310 is granted to the processor 320a, the processor 320a sends a read command including a read address to the main memory 330 via the system bus 310. The processor 320a then releases the system bus 310 so that the system bus 310 can be granted to another bus requester, if any. In response to the read command from the processor 320a, the main memory 330 retrieves the requested data unit and request for system bus use. When the system bus 310 is granted to the main memory 330, the main memory 330 sends the requested data unit to the processor 320a via the system bus 310. When the transfer is complete, the main memory 330 releases the system bus 310 so that the system bus 310 can be granted to another bus requester, if any. After obtaining the requested data unit, the processor 320a can process it. Then, the processor 320a can repeat the process described above to obtain another data unit from the main memory 330 for processing. If the processor 320a needs to obtain a large number of data units from the main memory 330, the processor 320a has to spend a lot of time issuing multiple read commands to the main memory 330. This prevents the processor from performing other tasks.

In the prior art, there have been attempts to decrease processing latency. Many of these attempts involve using a cache memory in the microprocessor to carry out the read operation. For example, U.S. Pat. No. 5,940,856 describes a method to decrease the latency of a read operation. When a first processor writes data in the cache memory, the data entry is marked as notified. If a second processor wants to read that data, the method provides a fast way to bring the data to the second processor by reading data from the cache memory of the first processor, rather than writing to and reading from external memory.

U.S. Pat. No. 5,761,724 discloses a system in which a first processor has modified data in its cache memory. In the case where a second processor tries to read that data, and the modification has not yet been reported to the external memory, the cache memory will provide the correct data to the second processor. This saves time by not accessing the external memory because the correct data is maintained in the cache memory.

It is the object of the present invention to provide a digital system and method that decreases the processing latency time so that the processor is available to perform additional tasks.

SUMMARY OF THE INVENTION

The above objects have been achieved by a digital system having a split transaction read buffer coupled between a processor and a system bus. The action to read data is split into two different actions, where the first transaction requests a read and the second read response transaction subsequently provides the requested data. The read buffer is implemented with two buffers, one incoming data buffer for reading data, and a second outgoing address buffer for sending read requests. The digital system can read the data from the data buffer while the data transfer is in progress. By being able to process the data as soon as the data is present in the read buffer, rather than waiting until the data transfer is complete, the processing latency time is reduced so that the processor is free to perform other additional tasks.

BRIEF DESCRIPTION OF THE DRAWINGS

FIG. 1 is a block diagram of the digital system of the present invention.

FIG. 2 is a block diagram of the read buffer of FIG. 1.

FIG. 3 is a flow chart of the operation of the bus requests used in the read buffer of FIG. 2.

FIG. 4 is a diagram showing the timing relation between data transfer and data processing as is known in the prior art.

FIG. 5 is a diagram showing the timing relation between data transfer and data processing for the present invention.

FIG. 6 is a block diagram of a digital system as is known in the prior art.

FIG. 7 is a block diagram of a general embodiment of the digital system of FIG. 1.

BEST MODE FOR CARRYING OUT THE INVENTION

With reference to FIG. 1, the digital system 15 of the present invention includes a processor 21 which is coupled between a program control unit 20 and a system bus 99. Between the processor 21 and the system bus 99 are a read buffer 50 and a write buffer 40. A plurality of field access registers 28 are also coupled to the processor 21. The processor 21 preferably includes a data memory unit 22 electrically coupled to an arithmatic logic unit (ALU) 25. The ALU 25 includes an integer ALU 24 and a floating point unit 26.

The program control unit 20, as is commonly known in the art, preferably includes a program counter, an instruction memory, an instruction register, an instruction pipeline register, and a plurality of pointer indexes and register indexes for addressing the data memory unit 22. The program control unit 20 generates addresses for the data memory unit and control signals for the integer ALU, floating point accumulator 26, field access registers 28, and external memory buffers 40, 50. Each instruction defines a movement or combination of data in the data memory unit or it defines a program control operation.

The data memory unit 22 is preferably a dual port data memory such that it receives both address signals and control signals on an input line 31. In the preferred embodiment of the invention, the data memory unit 22 is an 96-word by 32-bit dual port data memory. The read buffer 50 includes an address buffer 51 and a data buffer 52. Similarly the write buffer 40 includes an address buffer 41 and a write buffer 42. The write buffer 40 is used to write data from the data memory 22 to the system bus 99. The read buffer 50 is used to read data bytes from the system bus 99 into the data memory 22.

With reference to FIG. 2, the read data buffer 50 includes an address buffer 51 and a data buffer 52. The instruction flow 71 coming from the processor includes a decoding operand 72 and a decoding instruction 73 which make up the read instruction that is written to the address buffer 51 on input lines 82, 83 and 84. The decoding operand 72 is also sent to the data buffer 52 along input line 81. The read buffer 50 also includes a bus requester unit 53. The bus request unit 53 is a state machine which sees the address buffer 51 as being not empty and reads it, stores the address and the number of data bytes in the register, and requests the system bus 99 by sending a request 61 to the arbiter on the system bus. When the request is granted, the bus request unit receives an acknowledgment 62. A counter unit 55 increments or decrements the address value provided to the system bus 99 on line 63, which is enabled by line 74. The increment and decrement values are a function of the number of data bytes transferred in one cycle. The address buffer 51 is in direct communication with the bus request unit 53 through lines 88 and 89. The data buffer 52 receives an address value on a first input 87 and receives the data bytes on a second input line 64. An AND gate 56 is connected to the data buffer 52 and the decoding operand to send a stall signal 86 to the processor when the data buffer is empty as indicated by line 85.

With reference to FIG. 3, the general behavior of the bus requester unit is shown. The purpose of the bus request unit is to request the system bus while there is an address in the address buffer. Therefore the bus request unit is in an idle state until an address is input into the address buffer, at which point it processes a request 161. After the request is processed, the bus request unit decreases the number of data bytes 162 and checks if the number of data bytes has been completely transferred. If not, the transfer is not completed and it requests the bus again 161 to get following data. When the number of data bytes has been completely transferred, the number of data bytes equal zero and the bus request unit goes back to the idle state 160. Then, the bus request unit goes to the process request state 161 if the address buffer is not empty, meaning there is another transfer pending. The write buffer works in a similar manner, only the data has to be provided before the initialization of the transfer. When the data FIFO is full and the processor wants to write, a stall signal is produced to stall the processor.

A more detailed explanation of the operation of the digital system of the present invention is given with reference to FIG. 7. The digital system 400, according to a general embodiment of the present invention, includes a system bus 99, a main memory 405 coupled to the system bus 99, a bus arbiter 402 coupled to the system bus 99, and a plurality of processors 21a . . . 21n each of which is coupled to the system bus 99 via read buffer consisting of a Read Address FIFO (First In First Out) buffer 223 and a Read Data FIFO buffer 227. In other words, the processor 21a is coupled to the system bus 99 via the Read Address FIFO 51a and the Read Data FIFO 52a, and so on.

In the present invention, while executing a program, the processor 21a executes a first READ instruction which specifies a first number and a first address. The first number specifies, illustratively, the number of data octets (8 Bytes) to be read from the main memory 405 and the first address specifies the address of a first data octet to be read from the main memory 405. The main memory 405 as described in FIG. 7 is the system memory, not the data memory unit of the processor 21a. Preferably, the number of octets that can be requested in a READ instruction is one, two, or four. The processor 21a executes the first READ instruction by sending the first address and the first number to the Read Address FIFO 51a. Then, the processor 21a moves on to the next instructions in the program which may or may not use the data requested by the first READ instruction. However, a first use instruction that uses the data requested by the first READ instruction should be located far enough from the first READ instruction so that when the first use instruction is executed, some data units requested by the first READ instruction have arrived in the Read Data FIFO 52a from the main memory 405.

After receiving the first address and the first number from the processor 21a, the Read Address FIFO 51a requests for system bus use. If there are multiple bus requests pending, the bus arbiter 402 grants the system bus 99 to one of the requesters according to some bus allocation policy. When the system bus 99 is granted to the Read Address FIFO 51a, the Read Address FIFO 51a sends a copy of the first address to the main memory 405 via the system bus 99. The Read Address FIFO 51a also sends the main memory 405 its device number which is also the device number of the Read Data FIFO 52a. Then, the Read Address FIFO 51a releases the system bus 99 so that the system bus 99 can be granted to other bus requesters, if any. The Read Address FIFO 51a increments the first address so that the first address now points to the next data octet in the main memory 405. The Read Address FIFO 51a also decrements the first number by one so that the number of octets to be read is one less than initially. The Read Address FIFO 51a repeats the process described above until the first number reaches zero. In a preferred embodiment of the present invention, the Read Address FIFO 51a has a plurality of entries each of which can hold one address and one number. As a first example, the Read Address FIFO 51a has four entries. As a result, the Read Address FIFO 51a can hold up to four pending READ instructions. The first address and the first number occupy the first of the four entries of the Read Address FIFO 51a.

After receiving the first address from the Read Address FIFO 51a, the main memory 405 retrieves a first octet requested by Read Address FIFO 51a. When the main memory 405 is ready to send the first octet, the main memory 405 requests for system bus use. When the system bus 99 is granted by the bus arbiter 402 to the main memory 405, the main memory 405 sends the first octet to the Read Data FIFO 52a via the system bus 99. Because the Read Address FIFO 51a sent its device number to the main memory 405, the main memory 405 knows where to send back the first octet. When the transfer is complete, the main memory 405 releases the system bus 99 so that the system bus 99 can be granted to other bus requesters, if any.

In the first example above, assuming the first number is initially four, the Read Address FIFO 51a sends four data requests to the main memory 405. For each request, the main memory 405 returns one octet to the Read Data FIFO 52a. It is not necessary that the four requests occupy four consecutive system bus cycles or that the requested four octets are returned to the Read Data FIFO 52a in consecutive system bus cycles.

In another preferred embodiment of the present invention, after receiving the first address and the first number from the processor 21a, the Read Address FIFO 51a requests for system bus use. When the system bus 99 is granted to the Read Address FIFO 51a, the Read Address FIFO 51a sends a copy of the first address and the first number to the main memory 405 via the system bus 99. The Read Address FIFO 51a also sends the main memory 405 its device number which is also the device number of the Read Data FIFO 52a. Then, the Read Address FIFO 51a releases the system bus 99 so that the system bus 99 can be granted to other bus requesters, if any. After receiving the first address and the first number from the Read Address FIFO 51a, the main memory 405 retrieves a number of octets specified by the first number from a location in the main memory 405 specified by the first address. When granted system bus use, the main memory 405 sends the requested octets, one octet per system bus cycle, to the Read Data FIFO 52a. It is not necessary that the octets are sent in consecutive system bus cycles.

After executing the first READ instruction, the processor 21a may execute a first use instruction which uses one or more of the octets stored in the Read Data FIFO 52a. The first use instruction may be next to or a number of instructions away from the first READ instruction in the program. However, the first use instruction should be located far enough from the first READ instruction so that when the first use instruction is executed, it is likely that at least the octets which the first use instruction is supposed to use have arrived in the Read Data FIFO 52a from the main memory 405. The first use instruction may be any instruction that causes the processor 21a to use one or more of the octets requested by the first READ instruction in the Read Data FIFO 52a. The octet(s) used by the first use instruction are popped out of the Read Data FIFO 52a.

In the first example above, the Read Address FIFO 51a sends out four requests successively to the main memory 405. The main memory 405 sends back to the Read Data FIFO 52a four octets respectively corresponding to the four requests. In other words, the first octet corresponding to the first request is sent to the Data FIFO 52a first, the second octet corresponding to the second request is sent to the Data FIFO 52a second, and so on. The first use instruction can be a first MOVE instruction that moves the first octet from the Read Data FIFO 52a to a register of the processor 21a. As a result, the first octet is popped out of the Read Data FIFO 52a.

After executing the first use instruction, the processor 21a can execute a second use instruction that uses one or more of the octet stored in the Read Data FIFO 52a. The second use instruction may be next to or a number of instructions away from the first use instruction in the program. However, the second use instruction should be located far enough from the first use instruction so that when the second use instruction is executed, it is likely that at least the octet(s) which the second use instruction is supposed to use have arrived in the Read Data FIFO 52a from the main memory 405.

In the first example above, the second use instruction can be a second MOVE instruction that moves the second octet from the Read Data FIFO 52a to a register of the processor 21a. As a result, the second octet is popped out of the Read Data FIFO 52a. To use up the four octets requested by the first READ instruction, a third and fourth MOVE instructions can be used in the program to use the third and fourth octets in the Read Data FIFO 52a, respectively, corresponding to the first READ instruction. The third and fourth MOVE instructions should be located in the program such that when they are executed by the processor 21a the octets which they are supposed to use are likely in the Read Data FIFO 52a.

In case a use instruction is executed when the octet(s) which it is supposed to use have not arrived in the Read Data FIFO 52a, the processor 21a stalls waiting for the octet(s). As soon as the octet(s) come, the processor 21a continues the use instruction to use the octet(s). In the first example above, if the third MOVE instruction is executed when the third octet has not arrived from the main memory 405, the processor 21a stalls waiting for the third octet. As soon as the third octet arrives in the Read Data FIFO 52a, the processor 21a continues to execute the third MOVE instruction to use the third octet.

In a preferred embodiment of the present invention, a unique code of the Read Data FIFO 52a is specified in a use instruction to indicate that the Read Data FIFO 52a is a source of operand. In the first example above, the first MOVE instruction may have an opcode field, a destination field, and a source field. The unique code of the Read Data FIFO 52a is specified in the source field of the first MOVE instruction in order for the first octet in the Read Data FIFO 52a to be used as a source of operand.

In a preferred embodiment of the present invention, the Read Data FIFO 52a has a plurality of entries each of which can hold an octet. The number of entries should be large enough to hold the maximum number of octets corresponding to the pending READ instructions. In the first example above, because there can be up to four pending READ instructions in the Read Address FIFO 51a, each of which can request up to four octets from the main memory 405, the Read Data FIFO 52a has sixteen entries. When the fourth and last octet corresponding to the first READ instruction is used by the fourth MOVE instruction, this last octet is popped out of the Read Data FIFO 52a and the Read Address FIFO 51a clears the corresponding entry which holds the first address and first number. This cleared entry can accept a new pair of address and number corresponding to a new READ instruction.

If a READ instruction is executed when the Read Address FIFO 51a is full, the processor 21a is stopped with a deadlock error message. The processor 21a is designed not to stall here. If the processor 21a stalled waiting for an entry in the Read Address FIFO 51a to become empty, no more octets would be used and popped out from the Read Data FIFO 52a, and as a result, no entry in the Read Address FIFO 51a would be cleared, and there would be a deadlock situation.

Similarly, if a use instruction is executed when both the Read Data FIFO 52a and the Read Address FIFO 51a are empty, the processor 21a is stopped with a deadlock error message. The processor 21a is designed not to stall here. If the processor 21a stalled waiting for data, none would come because no READ instruction is pending, and there would be a deadlock situation. In the first example above, if the first MOVE instruction is executed before the first READ instruction, the processor 21a is stopped with a deadlock error message.

Therefore, a programmer should keep track of READ instructions and use instructions to avoid deadlock situations. Moreover, a programmer should delay the use instructions after a READ instruction in the program as long as possible to reduce the likelihood of processor stalling. In the first example above, after the first READ instruction, there should be setup instructions before the first MOVE instruction so that when the first MOVE instruction is executed, it is very likely that the first octet has arrived in the Read Data FIFO 52a. Here, even if the first octet has not arrived in the Read Data FIFO 52a and hence the processor 21a stalls, the stalling time will be likely short.

After executing the first READ instruction, the processor 21a can execute a second READ instruction. The second READ instruction can be executed before or after the first use instruction discussed above. The second READ instruction is executed in a similar manner as the first READ instruction. However, all use instruction(s) that cause the processor 21a to access the Read Data FIFO 52a to use the octet(s) requested by the second READ instruction are executed only after the execution of the last use instruction that uses the last octet requested by the first READ instruction. In the first example above, all use instruction(s) that cause the processor 21a to access the Read Data FIFO 52a to use the octet(s) requested by the second READ instruction are executed only after the execution of the fourth MOVE instruction.

Referring back to FIG. 2, the Read Data FIFO 52a includes an AND gate 310 which receives as inputs an Empty signal and a Read signal and generate as output a stall signal. The Empty signal is generated whenever the Read Data FIFO 52a is empty. The Read signal comes from the processor 21a and is generated whenever a use instruction is executed. The stall signal is generated whenever both the Empty and the Read signals are generated.

In a preferred embodiment of the present invention, if a use instruction accesses the Read Data FIFO 52a which is empty, and there is a pending READ instruction in the Read Address FIFO 51a, the stall signal is generated and sent to the processor 21a to disable a clock of the processor 21a. As a result, the processor 220 stalls. As soon as an octet arrives in the Read Data FIFO 52a, the stall signal becomes inactive and the clock restarts and the processor 21a continues the execution of the use instruction.

The benefit of this implementation, compared to the regular direct memory access of the prior art, is to decrease the latency of processing. With reference to FIG. 5, it can be seen that the start 132 of the data processing step 101 occurs before the completion of the data transfer 111. Therefore the data processing will be completed in a shorter amount of time than in the prior art, thus decreasing the processing latency 125.

What is claimed is:

1. A digital system comprising:
   a system bus;
   a processor; and
   a read buffer electrically coupled between the processor and the system bus, said read buffer including an address buffer and a data buffer, said address buffer having means for receiving a read instruction from the processor and means for storing a plurality of address data, said data buffer having means for receiving a plurality of data bytes from the system bus, wherein the processor has means for reading data in said data buffer before a data transfer of said plurality of data bytes to said data buffer from a main memory electrically coupled to the system bus is complete.

2. The digital system of claim 1 wherein the read buffer is a direct memory access (DMA) controller.

3. The digital system of claim 1 wherein the processor includes a program control unit and a data memory unit electrically coupled to the program control unit, said read buffer being electrically coupled to the data memory unit.

4. The digital system of claim 1 wherein the plurality of address data includes an address value and a quantity of data bytes value.

5. The digital system of claim 4 wherein the read buffer includes a bus request unit electrically coupled between the system bus and the address buffer.

6. The digital system of claim 5 wherein the bus request unit includes means for checking the quantity of data bytes value to determine whether the plurality of data bytes has been completely transferred.

7. The digital system of claim 5 wherein the bus request unit includes means for requesting access to the system bus when the address value is stored in the address buffer.

8. The digital system of claim 3 further comprising an arithmetic logic unit electrically coupled to the data memory unit.

9. The digital system of claim 4 further comprising means for stalling the system when the data buffer is empty.

10. The digital system of claim 9 wherein the means for stalling the system includes a logic gate having a first input to receive the read instruction and a second input to receive the quantity of bytes value and producing a stall signal at an output.

11. The digital system of claim 1 further comprising a write buffer electrically coupled between the processor and the system bus, said write buffer including a write address buffer and a write data buffer, said write address buffer having means for receiving a write instruction from the processor, said write data buffer having means for receiving a plurality of data bytes from the processor and for writing the plurality of data bytes to the system bus.

12. The digital system of claim 3 wherein the program control unit includes an instruction memory electrically coupled to a program counter, an instruction register electrically coupled to the instruction memory, and an instruction decode unit electrically coupled to the instruction memory.

13. The digital system of claim 12 wherein the program control unit includes an instruction pipeline register electrically coupled between the instruction register and the data memory unit.

14. The digital system of claim 3 wherein the data memory unit is a dual port memory unit.

15. The digital system of claim 8 wherein the arithmetic logic unit includes a multiplier unit, a multiplier-accumulator unit, and at least one floating-point accumulator unit.

16. The digital system of claim 15 wherein the arithmetic logic unit includes an integer arithmetic logic unit.

17. A digital system comprising:
   a system bus;
   a processor, including a data memory unit; and
   a read buffer electrically coupled between the data memory and the system bus, said read buffer including an address buffer and a data buffer, said address buffer having means for receiving a read instruction from the processor and means for storing an address value and a quantity of data bytes value, said data buffer having means for receiving a plurality of data bytes from the system bus, said plurality of data bytes being transferred from the data buffer to the data memory, wherein the processor has means for reading data in said data buffer before a data transfer of said plurality of data bytes to said data buffer from a main memory electrically coupled to the system bus is complete, said read buffer further including a bus request unit electrically coupled between the system bus and the address buffer.

18. The digital system of claim 17 wherein said bus request unit includes means for checking the quantity of data bytes value to determine whether the plurality of data bytes has been completely transferred and means for requesting access to the system bus when the address value is stored in the address buffer.

19. The digital system of claim 17 further comprising means for stalling the system when the data buffer is empty.

20. The digital system of claim 19 wherein the means for stalling the system includes a logic gate having a first input to receive the read instruction and a second input to receive the quantity of bytes value and producing a stall signal at an output.

21. The digital system of claim 17 further comprising a write buffer electrically coupled between the data memory unit and the system bus, said write buffer including a write address buffer and a write data buffer, said write address buffer having means for receiving a write instruction from the data memory unit, said write data buffer having means for receiving a plurality of data bytes data memory unit and for writing the plurality of data bytes to the system bus.

22. A method for reading data in a digital system comprising:

providing a read buffer electrically coupled between a processor and a system bus, said read buffer including an address buffer and a data buffer and a bus request unit;

writing a first read instruction into the address buffer, said first read instruction including an address and a quantity of data bytes value;

determining that the address buffer contains the first read instruction;

requesting a local bus for a number of data bytes, said number of data bytes being less than or equal to the quantity of data bytes value;

fetching the data bytes from the system bus; and writing the data bytes in the data buffer, wherein the processor may read data in the data buffer before a data transfer of the number of data bytes to the data buffer from main memory is complete.

23. The method of claim 22 further comprising:

determining whether the data bytes have been completely transferred; and repeating the steps of requesting, fetching and writing when the data bytes have not been completely transferred.

24. The method of claim 22 further comprising:

determining whether the data bytes have been completely transferred; and placing the bus request unit in an idle state when the data bytes have been completely transferred.

25. The method of claim 22 further comprising:

following the step of writing the data bytes in the data buffer, decreasing the quantity of data bytes value by the number of data bytes written to the data buffer.

26. The method of claim 22 further comprising the step of transferring the data bytes from the data buffer to the processor.

* * * * *